(12) United States Patent
Hong et al.

(10) Patent No.: US 6,675,247 B1
(45) Date of Patent: Jan. 6, 2004

(54) LOOP FORMATION ELIMINATING APPARATUS OF A SERIAL BUS SYSTEM AND METHOD THEREOF

(75) Inventors: Seong-Wook Hong, Seoul (KR); Seung-Min Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/493,035

(22) Filed: Jan. 28, 2000

(30) Foreign Application Priority Data

Jan. 29, 1999 (KR) .......................... 1999-2963

(51) Int. Cl.[7] .................. G06F 13/00; G06F 15/163
(52) U.S. Cl. .......................... 710/305; 370/452
(58) Field of Search .................. 710/305, 62, 100, 710/63, 104, 72, 15; 370/229, 424, 256, 452; 709/220, 252; 714/717; 340/825.02

(56) References Cited

U.S. PATENT DOCUMENTS

| | | | | |
|---|---|---|---|---|
| RE32,516 E | * | 10/1987 | Cantwell, Jr. | |
| 6,119,195 A | * | 9/2000 | Ellis et al. | |
| 6,215,775 B1 | * | 4/2001 | Baldwin et al. | |
| 6,260,079 B1 | * | 7/2001 | White | |
| 6,519,231 B1 | * | 2/2003 | Ding et al. | |

* cited by examiner

*Primary Examiner*—Gopal C. Ray
(74) *Attorney, Agent, or Firm*—Fleshner & Kim LLP

(57) ABSTRACT

An apparatus for eliminating a loop formation in a serial bus system (IEEE1394) and a method therefore are disclosed. The apparatus includes a control state. The method includes judging whether a loop is formed between nodes based on a port connection state and a relationship with other nodes at each node while a tree identification is being performed, and eliminating one of the ports of an idle state when a loop is formed between the nodes as a result of the judgment.

8 Claims, 7 Drawing Sheets

LOOP FORMATION ELIMINATING APPARATUS OF A SERIAL BUS SYSTEM AND METHOD THEREOF

BACKGROUND OF THE INVENTION

1. Field of the Invention

The present invention relates to a serial bus system (IEEE1394), and in particular to an apparatus and method for virtually eliminating a loop formation between nodes formed due to a user's wrong operation in a serial bus system.

2. Description of the Background Art

A digital electric appliance, for example, CD, DVD, DVCR, PC, etc. which has a good anti-noise feature is advanced. In the above-described appliance, a data is digitally processed, and a digital interface is used for transferring data between different units.

In order to transfer a video or audio data having a large band width, an IEEE1394 high speed serial bus(hereinafter called as IEEE1394) designated based on the IEEE standard and disclosed by Apple company attracts a big attention in the industry. The above-described IEEE1394 defines each unit as a node for a digital interface between units connected. In addition, a signal connection portion at a point in which nodes are connected is defined as a port. One node may have more than one port. In order to connect the units, a certain cable designated for a corresponding port is used.

In the IEEE1394, when the connected units are disconnected, a bus reset, a tree identification and a self identification are performed and interfaced with a network.

Among the above-described operations, the bus reset performs a process that the ports which are connected with the nodes and the ports which are not connected with the nodes are separated, and the connected ports each become an idle state.

The tree identification forms a data transfer path between the connected nodes. When a loop is formed, the next routine is not performed.

When a data path is set between the units, one root node is formed, and the self identification is performed for allocating a certain number to each node, so that a ready state for transferring and receiving a data is obtained.

The conventional bus system will be explained with reference to the accompanying drawings.

Figure 1:
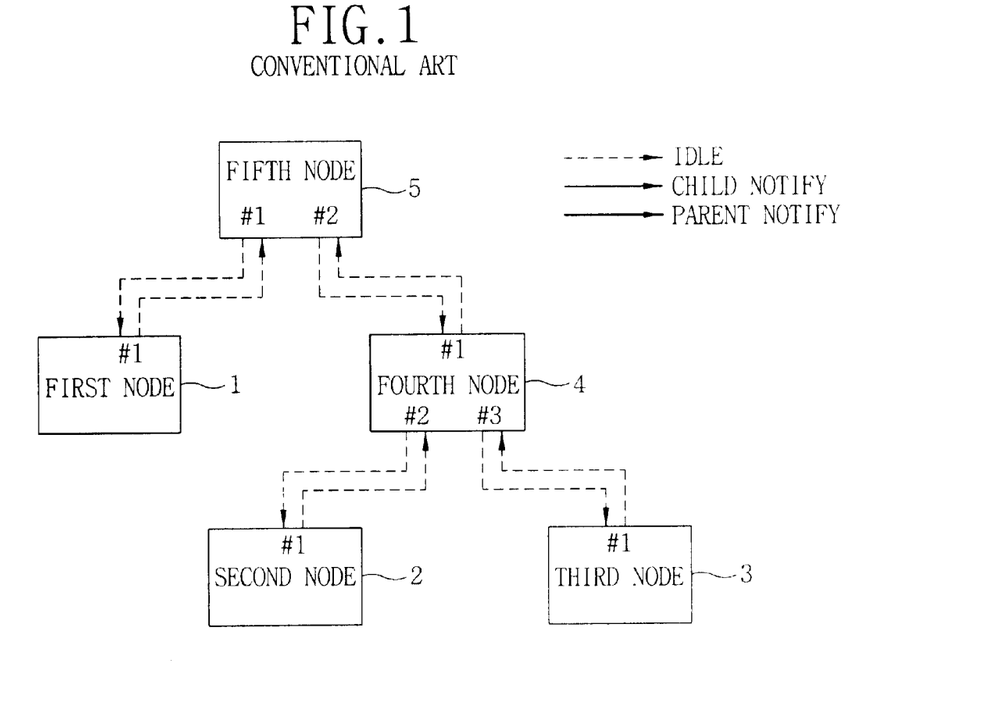
FIG. 1 is a view illustrating an initial state of a unit connection state of a conventional serial bus system.
Figure 2:
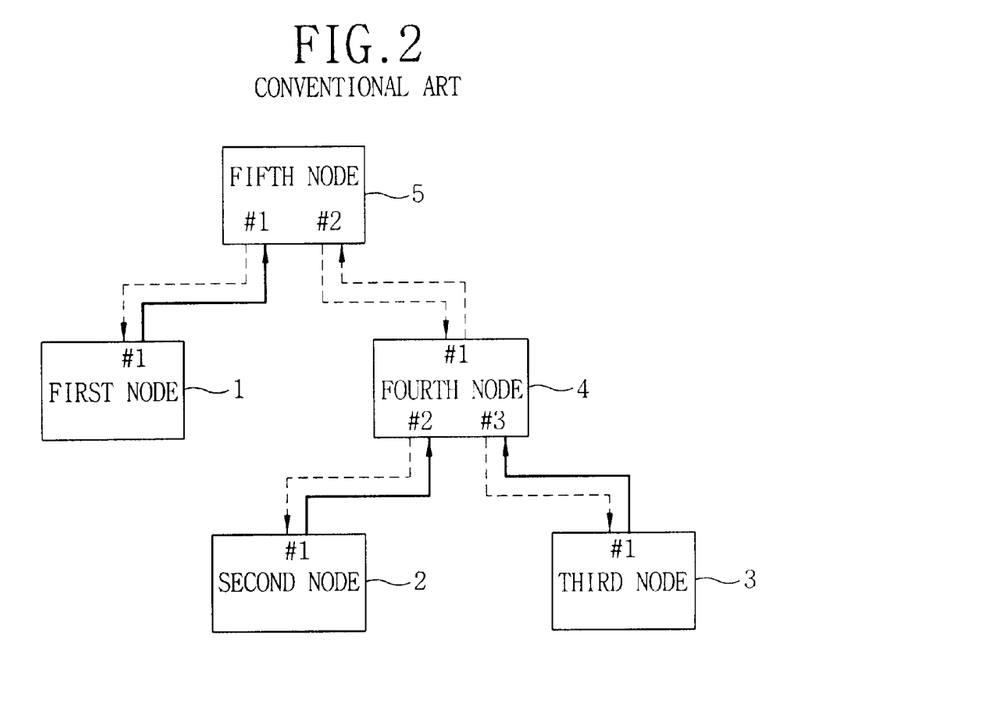
FIG. 2 is a view illustrating a start state of a child node handshake in a unit connection state of a conventional serial bus system.
Figure 3:
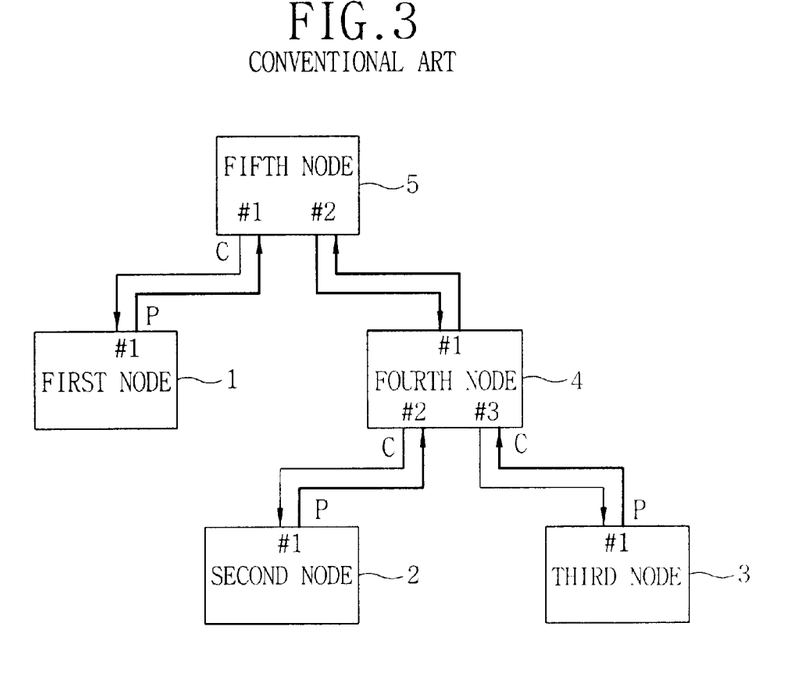
FIG. 3 is a view illustrating a node handshake end state of a unit connection state of another conventional serial bus system.

FIG. 1 illustrates an initial state among the unit connection states in a conventional bus system. As shown therein, a user connects a unit having five digital interfaces. At this time, each node performs a bus reset function, Thereafter, in the idle state, the node having one connected port among the nodes performs a tree identification as shown in FIG. 2 for thereby transferring a parent notify signal shown by the solid line in the drawings. In this case, first through third nodes 1, 2, and 3 each transmit a parent notify signal.

At this time, fourth and fifth nodes 4 and 5 each transmit a child notify signal to the first, second and third nodes 1, 2 and 3 based on the parent notify signal. A child node handshake is completed between the first and fifth nodes, and a child node handshake is completed between the fourth node and the second and third nodes.

The first number(#1) of the port number of the first node is defined as a parent port, and the first number(#1) of the port number of the fifth node is defined as a child port. The first number(#1) of each port number of the second and third nodes is defined as a parent port, and the second and third numbers(#2 and #3) of the port number of the fourth node are defined as a parent port. In addition, since the fourth and fifth nodes are all defined as the parent port except for the remaining one port(the second pot in the fifth node, and the first port in the fourth node, a parent notify signal is transmitted in the idle state therebetween.

Figure 4:
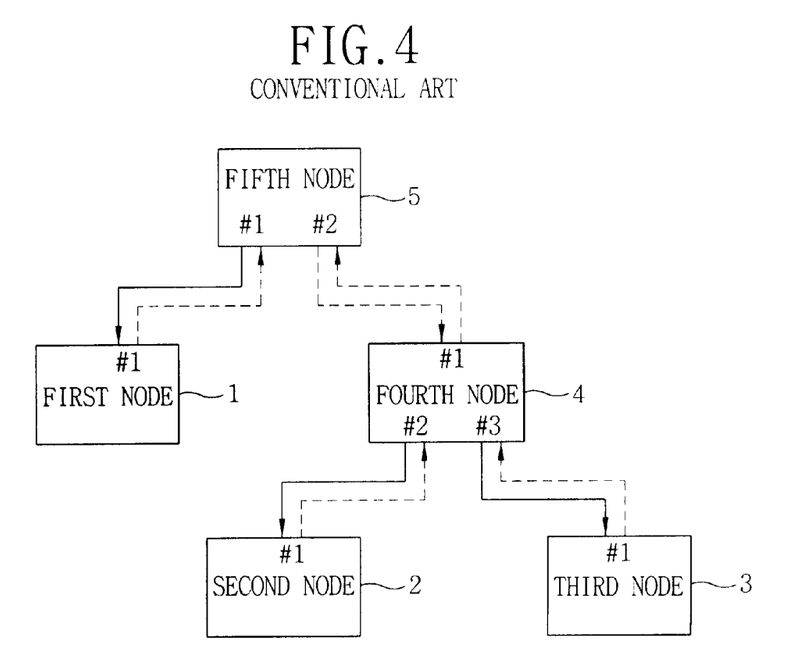
FIG. 4 is a view illustrating a parent node handshake start state and root competition state of a unit connection state of another conventional serial bus system.

Therefore, a root competition occurs between the fourth and fifth nodes. In this case, as shown in FIG. 4, the notify signal transmission is eliminated between the ports in which the parent competition occurred, and a root timer is designated based on a random value for thereby driving a timer. In this state, the child notify signal transmission is continuously performed. Since the child nodes receives the child notify signals, the child nodes transmit the child node handshake.

Figure 5:
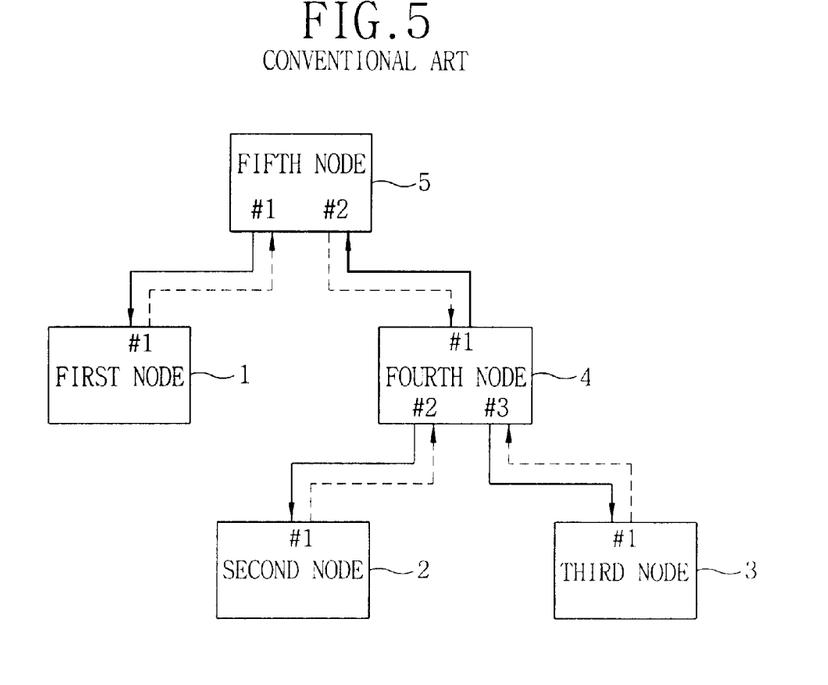
FIG. 5 is a view illustrating a new child node handshake start state after a root competition state of a unit connection state of a conventional serial bus system is completed.
Figure 6:
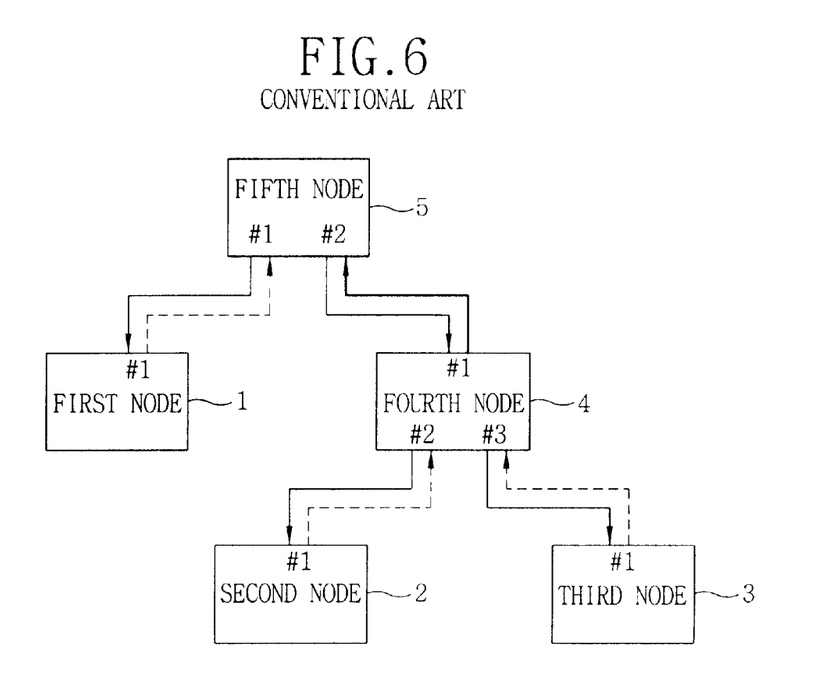
FIG. 6 is a view illustrating a final child node handshake end state after a root competition state of a unit connection state of a conventional serial bus system is completed.

Therefore, since the fourth and fifth nodes have different competition timer values, the node in which the time out earlier occurred transmits a parent notify signal. If the time out earlier occurred at the fourth node, as shown in FIG. 5. The fourth node transmits a parent notify signal to the fifth node, so that the parent node handshake is performed.

In a state that the fifth node is timed out, it is recognized that there is a parent notify signal from the port of the fourth node which is the competition node, and the fifth node became the root node, so that a child notify signal is transmitted to the fourth node. The fourth node which received the child notify signal transmits the child node handshake, so that the child node handshake is completed.

Figure 7:
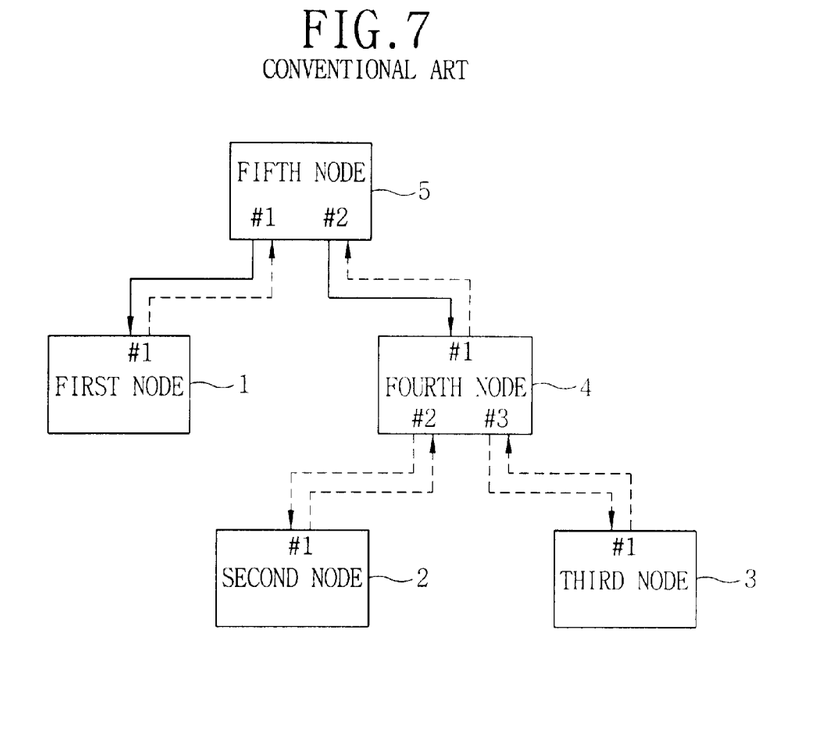
FIG. 7 is a view illustrating a final parent node handshake state after a root competition state of a unit connection state of a conventional serial bus system is completed.
Figure 8:
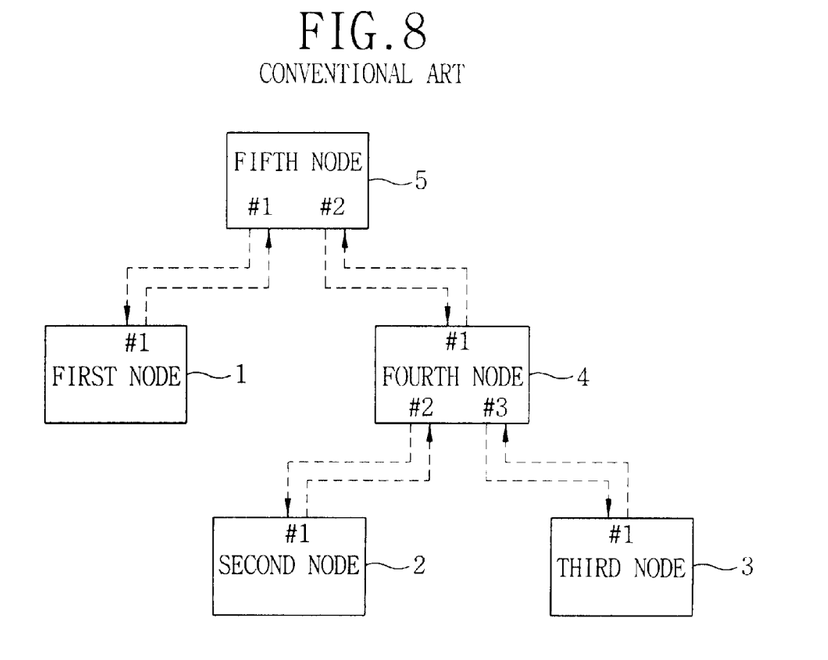
FIG. 8 is a view illustrating a node path determination end state after a root competition state of a unit connection state of a conventional serial bus system is completed.

Therefore, the parent nodes receive the child node handshake, and as shown in FIG. 7, the parent node handshake is transmitted, and as shown in FIG. 8, the tree identification is completed.

Figure 9:
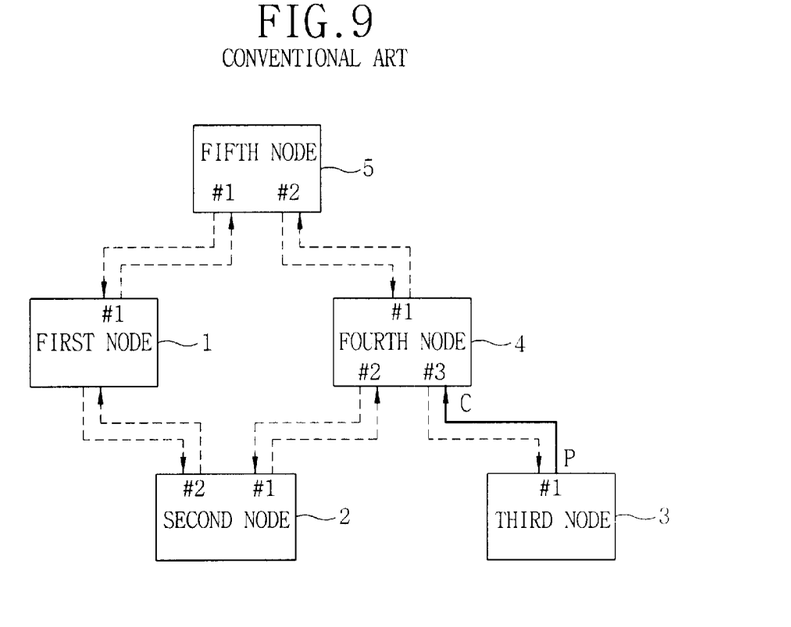
FIG. 9 is a view illustrating a state that a user erroneously forms a loop in a unit connection state of a conventional serial bus system.

In the conventional bus system, when a user erroneously forms a loop as shown in FIG. 9, the bus reset is performed, and the routine waits until the number of the idle state ports becomes below 1 at the connected ports. In this case, since the first, second, fourth and fifth nodes have two connected ports and are all in the idle state, they are all in the standby state. In this case, since only the third node has one port of the idle state, the third node defines the connected port as a parent port and transmits a parent notify signal to the fourth node.

However, in the case of the fourth node, the fourth node transmits a child notify signal to the child node. The remaining two ports are in the idle state. Namely, no operation is performed at the remaining two ports. Therefore, it is impossible to implement a normal operation.

SUMMARY OF THE INVENTION

Accordingly, it is an object of the present invention to provide a loop formation eliminating apparatus of a serial bus system and a method thereof which are capable of automatically eliminating a loop formed at a bus system when a user erroneously forms a loop based on the IEEE1394 for thereby implementing a normal operation.

To achieve the above object, there is provided a loop formation eliminating apparatus of a serial bus system in a bus system in which a serial bus is connected between a plurality of nodes each having more than one signal port and a data encoder/decoder, a loop formation eliminating apparatus of a serial bus system, which includes a control state machine for recognizing that a loop is formed between nodes when each node searches a signal from the data encoder/decoder and outputting a control signal for eliminating a signal port in which the loop is formed, and a port suspend logic unit for eliminating a signal of a signal port in which the loop is formed, in accordance with a control signal of the control state machine.

The control signal for virtually eliminating the signal port in which the loop is formed is outputted from a tree identification machine of the control state machine.

To achieve the above object, there is provided a loop formation eliminating method of a serial bus system in a system having a plurality of nodes, which includes a first step for judging whether a loop is formed between nodes based on a port connection state and a relationship with other nodes at each node while a tree identification is being performed, and a second step for virtually eliminating one of the ports of an idle state when a loop is formed between the nodes as a result of the judgment.

In the second step, one of the idle ports of the node in which the random timer is first timed out among the nodes in which the loop is formed is eliminated.

A step for performing a bus reset operation after the second step is performed is further provided.

To achieve the above object, there is provided a loop formation eliminating method of a serial bus system in a bus system having a plurality of nodes for performing a tree identification after a bus reset is performed, which includes a step in which each node registers a port, which is not connected, among the ports and a port which does not receive a parent notify during the tree identification as a child port, a step for judging whether a configuration is timed out when the number of the child ports is smaller than the number obtained by subtracting 1 from the total number of the ports, and a step for virtually eliminating one of the idle ports during the time out of the random timer after the random timer is set when the configuration is timed out as a result of the judgment.

In the step for virtually eliminating one among the idle ports, the random timer outputs a control signal for virtually eliminating one of the idle ports of the node in which the random timer among the root competing nodes is first timed out.

A step for performing a bus reset operation after the step for eliminating one of the idle ports is performed is further provided.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The embodiments for eliminating a loop formation of a serial bus system according to the present invention will be explained with reference to the accompanying drawings.

Figure 10:
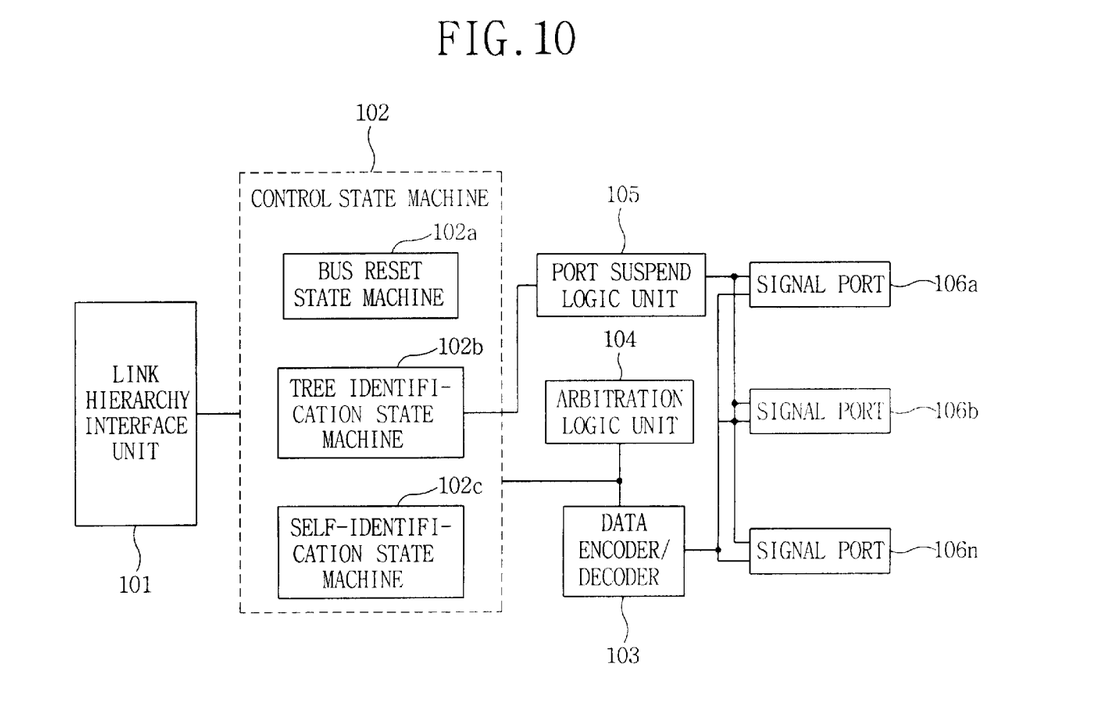
FIG. 10 is a view illustrating the construction and state of a loop formation eliminating apparatus of a serial bus system according to the present invention.

FIG. 10 is a view illustrating the construction of a loop formation eliminating apparatus of a serial bus system according to the present invention which includes a link hierarchy interface unit 101 for interfacing a link hierarchy which is a higher hierarchy of a physical hierarchy, a control state machine 102 connected with the link hierarchy interface unit 101 for transmitting and receiving a data of the physical hierarchy and the link hierarchy, a data encoder/decoder 103 for generating a strobe signal for a synchronization when transmitting and receiving a data to/from each node and generating a clock signal, an arbitration logic unit 104 for arbitrating the signals of each node, a port suspend logic unit 105 for insulating a signal of a port when a loop is formed, and a plurality of signal ports 106a through 106n for generating an electrical signal and transmitting and receiving data.

The control state machine 102 includes a bus reset state machine 102a for performing a bus reset operation when connecting and separating each node, a tree identification state machine 102b for providing a parent/child relationship of each node after the bus reset operation is performed, forming a tree structure and determining a root node, and a self-identification state machine 102c for providing a node ID to each node after the tree identification is performed.

Figure 11:
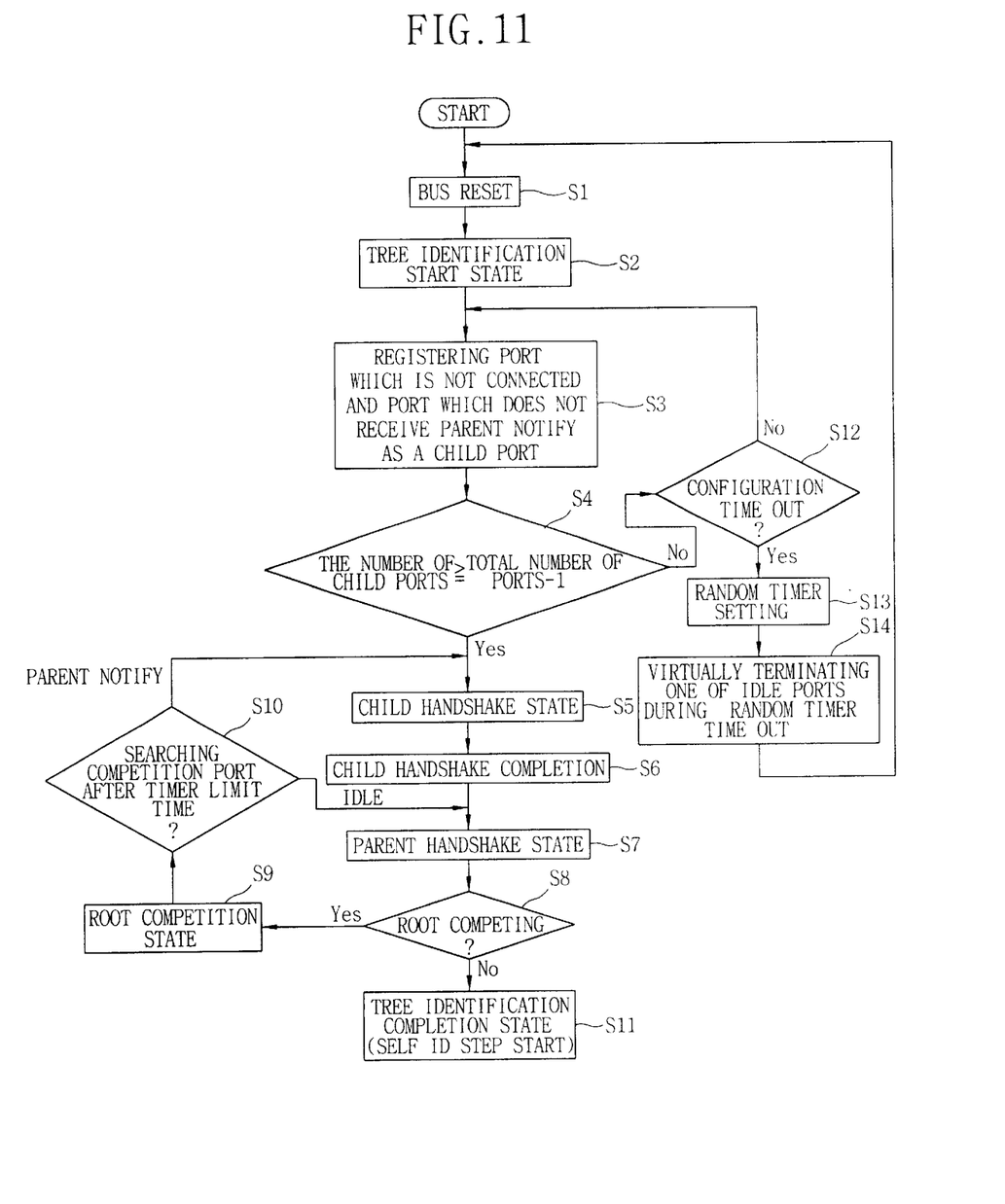
FIG. 11 is a flow chart of a loop formation eliminating method of a serial bus system according to the present invention.
Figure 12:
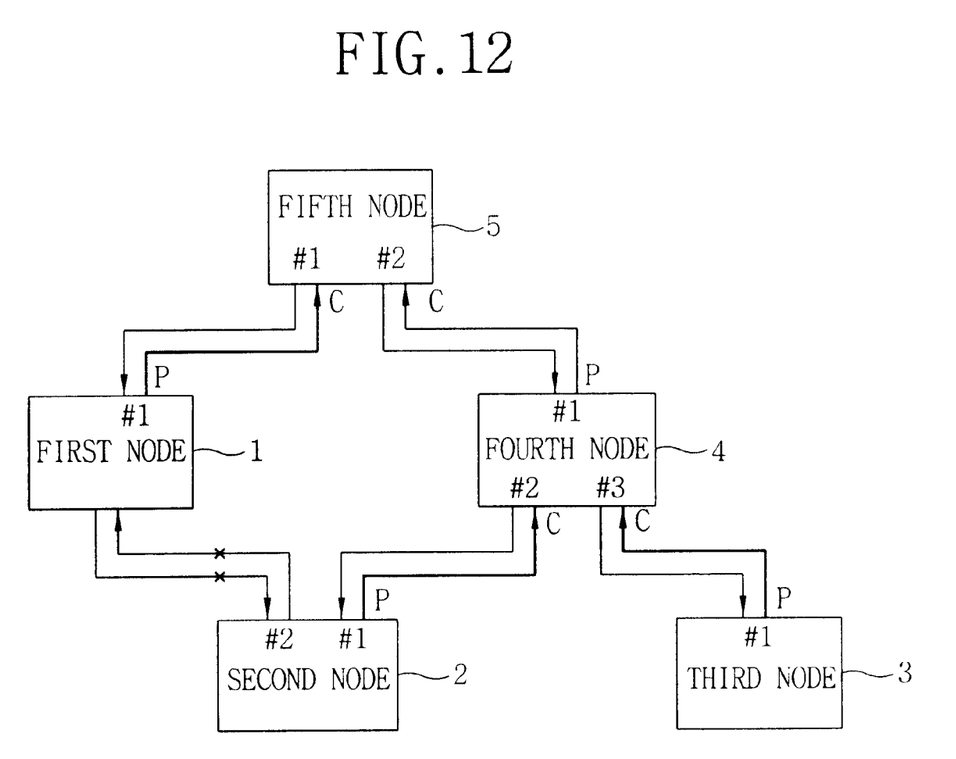
FIG. 12 is a view illustrating a loop formation eliminating state of a serial bus system according to the present invention.

FIG. 11 is a flow chart of a loop formation eliminating method of a serial bus system according to the present invention, and FIG. 12 is a view illustrating an embodiment of a loop formation eliminating state of a serial bus system according to the present invention. The loop formation eliminating apparatus of a serial bus system and an apparatus thereof according to the present invention will be explained. When a user accesses a system and disconnects the system, each node performs a bus reset operation. Namely, the link hierarchy interface unit 101 of each node interfaces a physical hierarchy and a link hierarchy which is a higher hierarchy of the same. At this time, the control state machine 102 is connected with the link hierarchy interface unit 101, so that the data of the physical hierarchy and the data of the link hierarchy are transmitted and received.

Namely, as shown in FIG. 10, the bus reset state machine 102a of the control state machine 102 performs a bus reset operation based on an access and disconnection of each node in Step S1.

After the bus reset operation is performed, the tree identification state machine 102b of each node becomes a tree identification start state in Step S2.

Thereafter, the tree identification state machine 102b provided a parent/child relationship of each node. At this time, the ports which are not connected and the ports which do not receive the parent notify signal are registered as a child port in Step S3.

Thereafter, the tree identification state machine 102b judges whether the number of the child ports is larger than or the same as the number obtained by abstracting 1 from the total number of the ports. As a result of the judgment, if the number of the child ports is the same as the above-described number, the routine becomes the child node handshake state, and the child node handshake operation is completed in Steps S4 through S6.

The tree identification state machine 102b becomes the parent node handshake state after the child node handshake is performed, and it is judged whether there is a root competition in Steps S7 and S8.

As a result of the judgment, in the case of the root competition, the tree identification state machine 102b searches the competition port after a certain limit time of the timer is elapsed in Steps S9 and S10.

As a result of the search of the competition port, in the case of the idle state, the tree identification state machine 102b becomes the parent node handshake state, and in the case of the parent notify state, the same becomes the child node handshake state. The above-escribed operation is repeatedly performed for thereby implementing the tree identification completion state, so that the self-identification step is performed in Step S11.

As a result of the judgment of Step S4, if the number of the child ports is smaller than the number obtained by abstracting 1 from the total number of the ports, the tree identification state machine 102b searches whether there is a configuration time out Conf_TIME_OUT in Step S12.

At this time, the configuration time out is set as 166 μs. As a result of the search, when the configuration time out is continued, if he number of the child ports is smaller than the number obtained by abstracting 1 from the total number of the ports, it is judged that the root is formed. Therefore, the tree identification state machine 102b sets a random timer and outputs a control signal so that one of the idle ports is eliminated during the time out of the random timer.

Namely, the tree identification state machine 102b outputs a control signal for virtually eliminating one of the idle state ports of the node in which the random timer among the competing nodes is first timed out. At this time, the port suspend logic unit 105 removes the signal port connected with the node in accordance with a control signal of the tree identification state machine 102b. When eliminating the signal port having a loop formed therein through the above-described operation, it is possible to obtain a tree structure as shown in FIG. 12.

In the loop formation eliminating apparatus of a serial bus system and a method thereof according to the present invention, when a loop is erroneously formed by a user, the thusly formed loop is automatically eliminated in the bus system for thereby implementing a normal operation.

As the present invention may be embodied in several forms without departing from the spirit or essential characteristics thereof, it should also be understood that the above-escribed embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a bus system in which a serial bus is connected between a plurality of nodes each having more than one signal port and a data encoder/decoder, a loop formation eliminating apparatus of a serial bus system, comprising:

a control state machine for recognizing that a loop is formed between nodes when each node searches a signal from the data encoder/decoder and outputting a control signal for virtually eliminating a signal from a signal port in which the loop is formed; and a port suspend logic unit for eliminating the signal of the signal port in which the loop is formed, in accordance with the control signal of the control state machine.

2. The apparatus of claim 1, wherein said control signal for virtually eliminating the signal port in which the loop is formed is outputted from a tree identification machine of the control state machine.

3. In a system having a plurality of nodes, a loop formation eliminating method of a serial bus system, comprising:

a first step for judging whether a loop is formed between the nodes based on a port connection state and a relationship with other nodes at each node while a tree identification is being performed; and a second step for virtually eliminating one of the ports of an idle state when a loop is formed between the nodes as a result of the judgment.

4. The method of claim 3, wherein in said second step, one of the idle ports of the node in which th a random timer is first timed out among the nodes in which the loop is formed is eliminated.

5. The method of claim 3, further comprising a step for performing a bus reset operation after the second step is performed.

6. In a bus system having a plurality of nodes for performing a tree identification after a bus reset is performed, a loop formation eliminating method of a serial bus system, comprising:

a step in which each node registers a port, which is not connected, among the ports and a port which does not receive a parent notify during the tree identification as a child port;

a step for judging whether a configuration is timed out when the number of the child ports is smaller than the number obtained by subtracting 1 from the total number of ports; and a step for virtually eliminating one of the idle ports during the time out of the random timer after a random timer is set when the configuration is timed out as a result of the judgment.

7. The method of claim 6, wherein in said step for virtually eliminating one among the idle ports, the random time outputs a control signal for eliminating one of the idle ports of the node in which the random timer among the root competing nodes is first timed out.

8. The method of claim 6, further comprising a step for performing a bus reset operation after the step for virtually eliminating one of the idle ports is performed.

* * * * *